(12) United States Patent
Roussel et al.

(10) Patent No.: US 6,468,579 B1
(45) Date of Patent: Oct. 22, 2002

(54) FOOD PRODUCT WITH A FIBROUS TEXTURE OBTAINED FROM WHEY PROTEINS

(75) Inventors: Laurence Roussel, Saint Arnoult en Yvelines; Florence Buret, Paris; Yves Lechat, Saint Arnoult en Yvelines, all of (FR)

(73) Assignee: Bongrain S.A., Viroflay Cedex (FR)

(*) Notice: Subject to any disclaimer, the term of this patent is extended or adjusted under 35 U.S.C. 154(b) by 20 days.

(21) Appl. No.: 09/590,979

(22) Filed: Jun. 9, 2000

(30) Foreign Application Priority Data

Jun. 11, 1999 (FR) .............................. 99 07433

(51) Int. Cl.[7] .......................... A23J 1/20; A23C 19/00; A23C 21/00
(52) U.S. Cl. ...................... 426/656; 426/89; 426/582; 426/516; 426/518; 426/583
(58) Field of Search .................... 426/656, 89, 516, 426/518, 583, 582

(56) References Cited

U.S. PATENT DOCUMENTS

| 4,156,028 A | 5/1979 | Hidalgo et al. ............. 426/276 |
| 4,315,954 A | 2/1982 | Kuipers et al. ............. 426/583 |

FOREIGN PATENT DOCUMENTS

| EP | 0 225 770 | 6/1987 |
| EP | 0727138 A1 | 8/1996 |
| GB | 1 471 398 | 4/1977 |
| GB | 20666644 A | 7/1981 |
| WO | WO 96/25051 | 8/1996 |
| WO | WO 96/34539 | 11/1996 |

*Primary Examiner*—Anthony J. Weier
(74) *Attorney, Agent, or Firm*—Perman & Green, LLP (57) ABSTRACT

Food product 17 obtained by extrusion baking of a mixture of dairy or cheese origin with a fibrous structure characterised in that the fibres form a network of macroscopic fibres whose diameters are in the order of 0.1 mm to 1 mm, ramified into microscopic fibres with diameters in the order of 1 $\mu$m to 0.1 mm, with the dry matter of the product at least partially originating from whey.

18 Claims, 4 Drawing Sheets

FOOD PRODUCT WITH A FIBROUS TEXTURE OBTAINED FROM WHEY PROTEINS

The invention concerns food products with a fibrous texture, obtained mainly from whey proteins, a manufacturing process by extrusion baking of these products and a manufacturing installation for application of the process.

Processes for the manufacture of dairy products by continuous extrusion are already known.

Document EP-A-727 138 describes one such extrusion process by means of which cheese or cheese products are obtained from a curd or milk fraction resulting from ultrafiltration of milk.

The process is comprised of the following stages: introduction of raw materials, transfer into a barrel with at least one zone in which the temperature is between 60° and 120° C. involving blending, texturing and baking. This process gives rise to products with stretched structures whose fibres have a diameter that is generally greater than 0.1 mm and in the order of millimeters.

Document WO-96/34 539 describes a process used to obtain a textured protein matrix containing a dispersion of inclusion bodies.

These products are obtained by means of a high-temperature extrusion process, notably at temperatures of 125 to 160° C. High temperatures such as this lead to the destruction of the initial protein mixture. The products obtained include protein fibres which are stable after cooling.

This document essentially describes the use of vegetable proteins such as soya. Document WO-96/25051 describes a process for the manufacture of a soft or semi-soft fibrous cheese. The fibrous mass is obtained after extrusion of the curdled milk.

These processes do not allow a cheese or milk mixture to be used to obtain a product with an extremely fine fibrous structure, comprising fibres whose sizes are in the range of $\mu$m to 0.1 mm, noticeable when the product is chewed and conferring on it original organoleptic characteristics.

Document US 4,156,028 also describes a process for the manufacture of fibre products whose fibres have diameters in the order of 100 $\mu$m for example. However, these products are obtained by a technique which involves dissolution followed by a coagulation bath; the principles and materials of this technique are considerably different from extrusion baking which brings together specific pressure and temperature features. The products obtained do not have a ramified network structure such as that described below.

To this end, a first aspect of the invention proposes a product obtained by extrusion baking of a mixture of dairy or cheese origin. This product has a fibrous structure with a network of macroscopic fibres whose diameters are in the order of 0.1 mm to 1 mm, ramified into microscopic fibres with diameters in the order of 1 $\mu$m to 0.1 mm, the dry matter in the product being at least partially obtained from whey.

The dry matter in the product typically comprises 30% to 100% of dry matter originating from whey.

The product consists of 15 to 50% of dry matter and typically 25 to 40%. The dry matter of the product consists of at least 35% of total proteins.

The dry matter originating from whey includes isolated and/or concentrated proteins, and/or dried whole whey, and/or dried whey fractions such as lactose, milk fats, lactoferrin, calcium or other milk minerals or fractions.

According to one application, the product contains, in addition to whey proteins, other protein fractions such as casein or caseinates, cheese, dried or concentrated milk, with dry matter from the product preferably comprised of at least 10% casein.

According to another application, the product contains, in addition to whey proteins, non-dairy proteins chosen from among concentrated or isolated vegetable proteins, especially wheat, soya or pea gluten, liquid or dry egg white, with non-dairy proteins representing 0 to 70% of the mixture's dry matter, and preferably 20 to 50%.

According to a second aspect, the invention concerns a food preparation incorporating a product in keeping with the description above added to various ingredients chosen from among cheeses, milk and derivative products (yoghurt, milk cream, milk powder, fromage blanc, butter), cereals, starches, flour, semolina, fruits and dried fruits, spices, seasoning, fats, flavouring, sugar-containing ingredients (sugar, honey . . . ), pieces of meat or fish or vegetables, so as to form ready-made meals, children's snacks, sandwiches, snack foods, breakfast products, burger- or sausage-shaped cheese products, vegetarian products, spreads, pate, cooking ingredients . . .

According to one application, the food preparation has a matrix comprised of fibres or bundles of fibres with sizes in the range of mm or $\mu$m, with the preparation having dimensions in the order of a few centimetres.

The preparation undergoes mechanical forming, metering, shaping in moulds or piping then pasteurised and sliced. The preparations obtained can be decorated, stamped, cooked or pre-cooked, pasteurised, sterilised and packaged.

According to one application, the preparation contains a product in accordance with the description above which encloses a dairy or non-dairy filling product.

According to another application, the preparation contains a product in accordance with the description above enclosed by a dairy or non-dairy coating product.

The preparation can also include salts, spices, seasoning and flavouring, oil or other fats, an acidity corrector such as lactic acid.

According to a third application, the invention concerns a process for the manufacture of products with a fibrous structure comprised of the following steps:

a) introduction of raw materials containing whey proteins into an extruder with at least one screw;

b) transfer of raw materials from one end to the other of the extruder barrel, adjusting the screw(s) and temperature within the barrel such that raw materials successively undergo a mixing and heating step up to a temperature of about 130° C., followed by a melting step with an increase in temperature of the material to above 130° C., generally between 140° C. and 200° C., and an increase in pressure to between 0 and 50 bars, such that plasticization of the transferred material takes place, especially of whey proteins;

c) extrusion at the far end of the barrel of the material obtained after plasticization through a die adapted for texturization, shaping and cooling the material such that a product with a fibrous structure is obtained.

Cooling takes place in the die to a temperature of 100° C., possibly even between 80° C. and 10° C., and consists of an initial cooling phase in an uncooled zone in the die at the outlet of the barrel, followed by a second cooling phase in a cooled zone of the die. The first cooling phase corresponds to an alignment zone of the melted mixture which is in a viscous state and has a viscosity of 1000 to 500,000 centipoises while the second cooling phase corresponds to a change of state from the viscous state to the solid state, the linear flow rate of the product at the outlet of the die being in the order of 2 to 10 m/min.

Heating to 130° C. in step b) is gradual or in stages.

The temperature can be adjusted during the process to modify the texture of products.

The mixture placed in the extruder is in the form of a powder, with all the required water added prior to the melting step, or in liquid or paste form.

According to one application, the whey proteins originate from whey protein concentrates or isolates which are 50 to 90% pure, preferably 70 to 80% pure, and also contain lactose, fats, minerals, secondary proteins of the casein macropeptide type.

The process also includes a cutting step at the outlet of the die such as chopping, slicing, crushing, tearing, shredding or similar to obtain chopped fibres forming flakes or bundles.

According to one application, it includes a step where the product is dried at the outlet of the die after cutting to produce rehydratable fibres for food preparations if need be.

The process can also include a culinary reconstitution step using chopped fibres mixed with various ingredients such as cheese, milk and derivative products, cereals, starches, flour or semolina, fats, spices, seasoning and flavouring.

It can also include a shaping step comprised of mechanical forming processes using a shaper or moulds or piping followed by pasteurisation and slicing, with the products obtained undergoing at least one of the following steps: decoration, coating, stamping, filling, frying, baking, pasteurisation, sterilisation, packaging.

According to one application, the material transferred to the die is filled with a filling product during the extrusion step, added through the coextrusion valve opening into the die.

The filling product can be obtained by means of an extrusion process.

According to a fourth aspect, the invention concerns a manufacturing installation for the application of the process presented above comprised of a screw extruder with two very similar interlocking screws which rotate in the same direction or in the opposite direction inside a horizontal barrel, a filling device attached at the near end of the barrel, fitted with one or more metering devices for metered flow of the mixture at a predetermined rate, an extrusion die located at the far end of said barrel, thermal treatment assembly for fine-tuning the temperature within the barrel and extrusion die, said barrel being comprised of:

- a first zone for supply of the product formula;
- a second zone for mixing, moisturisation where this is required, and heating the material up to a core temperature of at least 130° C.;
- a third zone for melting, increasing the temperature of the material to over 130° C., generally between 140 and 200° C. and pressure of the material to between 0 and 50 bars, depending on the composition of the formula, in which protein plasticization takes place, especially of whey proteins.

The second mixing and heating zone consists of 2 to 5 units, the third melting zone comprises 1 to 3 units, with a screw length to screw diameter ratio of about 10 to 33, typically between 25 and 33.

The extrusion die includes a first uncooled zone adjacent to the near end of the screw extruder, followed by at least one cooling zone, corresponding to an alignment zone for fibres in a viscous state and a change-of-phase zone from the viscous to solid state.

The die is connected to the barrel by means of at least one, and typically two, adapters. The first adapter has one or two perforations through which the melted and plasticized material is extruded; the second adapter is located between the first adapter and the extrusion die and its function is to balance materiel pressure and flow rate.

The extrusion die has an internal shape that is adapted to the final product, with size parameters designed to allow cooling of the melted and plasticized material to 100° C., possibly between 80 and 10° C. Its inner surface has a controlled roughness in order to exert shear forces on the product during the cooling process, the combination of cooling and shear forces leading to continuous.

Texturizaton of the cooled material to form fibres.

The installation can include an extrusion pump located, for example, between the first or second interface and die for steady supply to the die in order to stabilise product flow. This is often a gear pump whose body can be reheated by electrical resistances in order to maintain a melted and plasticized mass at the required temperature.

According to one application, a coextrusion valve opens into the extrusion die.

Other facets and advantages of the invention will become apparent in the course of the description which follows, with reference to the diagrams in which

FIGS. 7 and 8 represent food preparations developed from extruded fibre products incorporated into a mixture including other constituents, in particular cereals. FIG. 8 is a magnification of the core of the fibre bundle in diagram 7.

Figure 1:
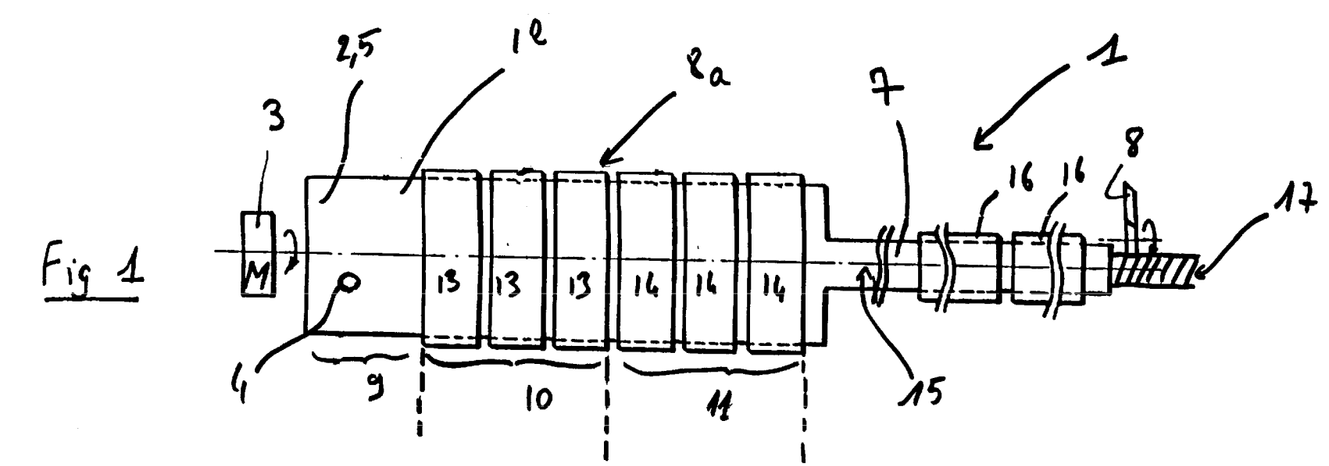
FIG. 1 illustrates an installation for the manufacture of ultrafibres according to a high-temperature and high-moisture extrusion process, according to one mode of application.
Figure 2:
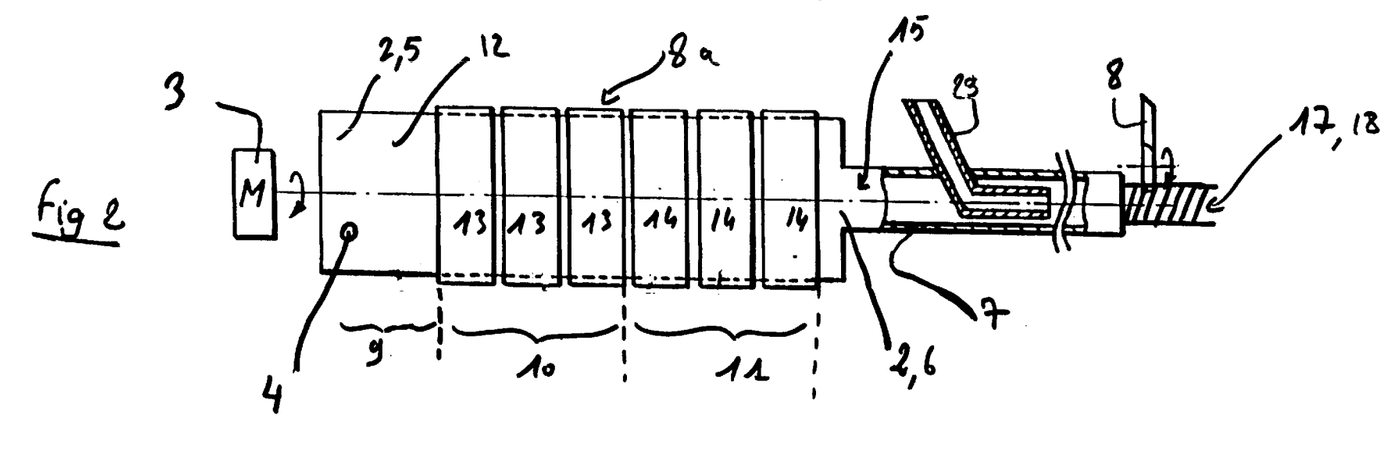
FIG. 2 illustrates an installation for the manufacture of ultrafibres according to a high-temperature and high-moisture extrusion process, according to another mode of application.
Figure 3:
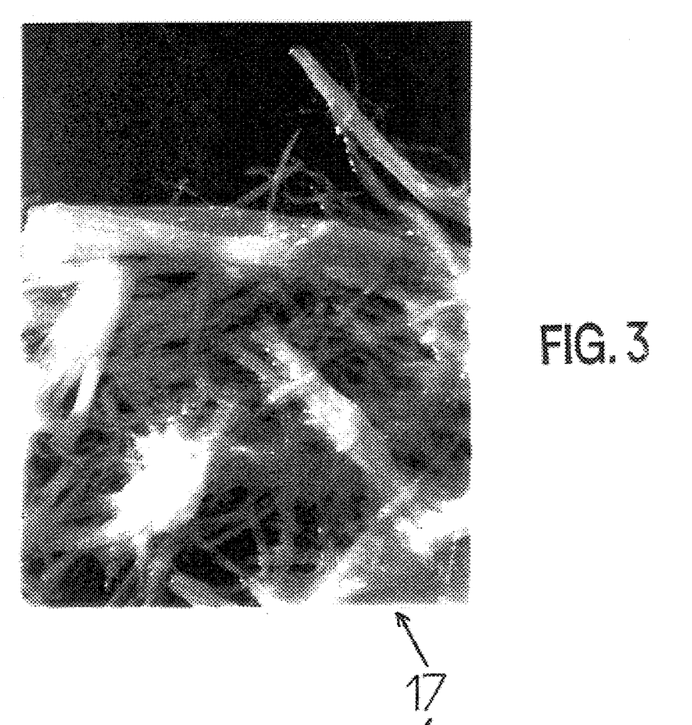
FIGS. 3 and 4 represent extruded fibre products after chopping, at the outlet of the extrusion die.
Figure 4:
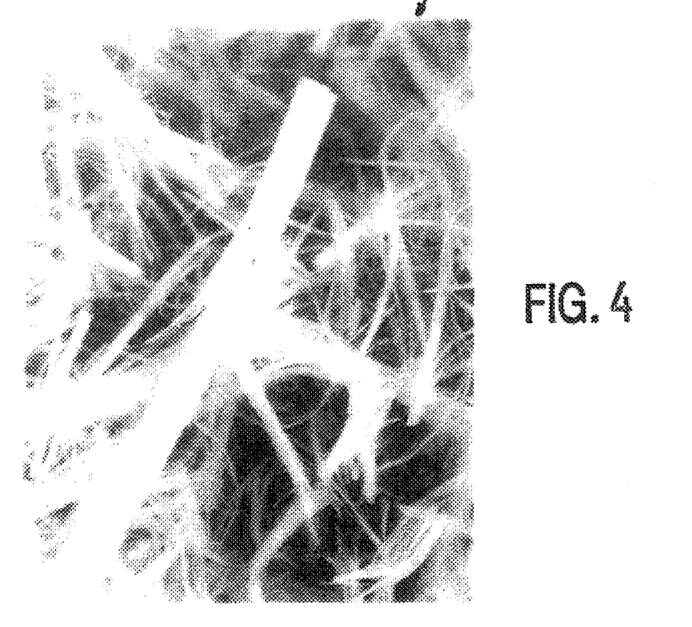
Figure 5:
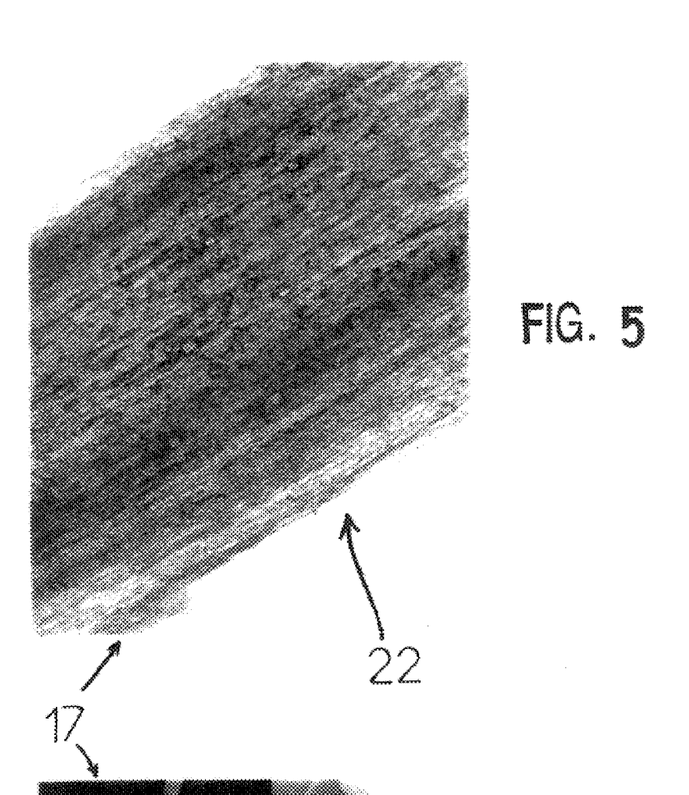
FIG. 5 represents magnification of a transverse cut of an isolated bundle of fibres as in diagram 3 or 4.
Figure 6:
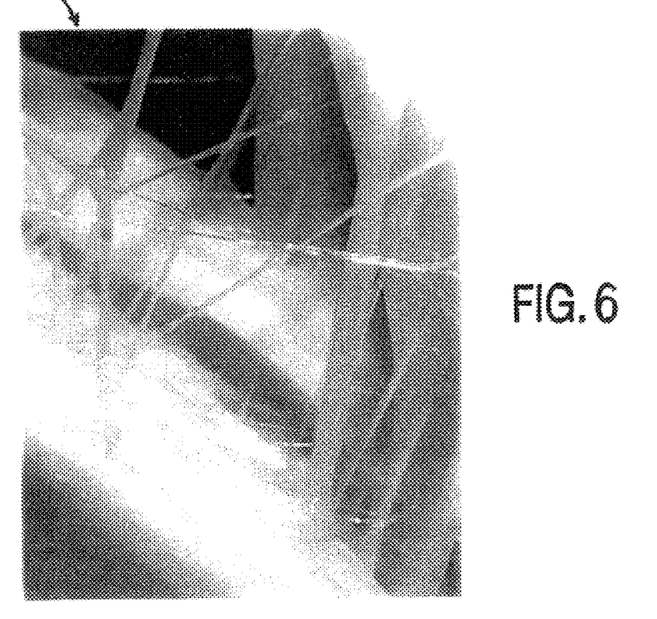
FIG. 6 represents magnification of a fragment of product leaving the extrusion die, with fibres shown by manual extension (×10 magnification)

A description of a manufacturing installation for application of the process leading to the production of fibrous dairy products is given below.

This installation comprises a screw extruder 1 with two very similar interlocking screws which rotate in the same direction or in the opposite direction inside a barrel 2. A single screw extruder is also possible.

Such an extruder consists of a motor 3 which drives the rotation of the two screws, interlocked by means of a reduction gear if necessary. Rotation is powered at a rate of 25 to 100 kW for example. These screws are preferably self-cleaning and the barrel 2 can be shifted manually or hydraulically along its longitudinal line to facilitates access to the screws.

The materials used to manufacture the barrel 2 and screws are obviously food grade materials.

A filling valve 4 is located towards the near end 5 of the barrel. This valve 4 is used to introduce raw materials to be processed into the screw extruder 1.

The barrel can also include openings for secondary supply along the line of the screws, for example for supply of water.

An extrusion die 7 is located at the far end 6 of the barrel 2. A cutting device 8, and where necessary recovery device, are placed at the outlet of the extrusion die.

According to established practices, the extrusion die 7 has a smaller diameter than the bore diameter of the barrel such that transferred materials are compressed.

In the case of continuous production, the installation comprises a metering device to feed raw materials into the filling valve 4 at a predetermined flow rate.

Heating 8a and cooling devices are adjusted to regulate temperature inside the barrel 2 and extrusion die 7.

The structure of the barrel 2 and extrusion process will be described below in more detail.

The term "mixture" is used to describe raw materials subjected to the steps in the process which take place after introduction of the materials, that is to say the heating, mixing and melting steps.

The barrel 2 consists of 3 adjacent zones 9, 10, 11.

The first, zone 9, is a filling zone into which the raw materials to be extruded are introduced. The filling valve 4 for the mixture opens here.

According to one application, these raw materials are in the form of a solid powder and are added through the filling valve, along with water. The water for the mixture is added in the filling zone either totally or partially, or can be added in the second zone 10.

According to another application, the raw materials are in liquid form and are added through the filling valve 4, in the case, for example, of liquid dairy products.

According to yet another application, the raw materials are in the form of a paste in the case of a cheese preparation such as ground curd, added through the filling valve, with water added in the filling zone and/or the second zone 10 where necessary.

All the water in the mixture is added prior to the melting step.

The composition of the mixture is given later.

The second zone 10 is where mixing, or moisturisation where necessary, and heating to at least 130° C. take place. The mixture is transferred from one end to the other of the barrel 2 while being exposed to compression and shear forces, in addition to being heated, as will be described later on.

The third zone 11 is the melting zone, with the temperature of the material increased to over 130° C., generally between 140° C. and 200° C., and the pressure increased to between 0 and 50 bars, depending on the composition of the formula, especially moisture content. Thermo-mechanical treatment which takes place in the third zone 11 is sufficient to cause the majority of food products to melt, especially whey proteins which undergo a plasticization step. The plasticization step and its effects on the final product will be described in a detail at a later point.

One application of the barrel 2 will now be described in more detail. This involves the first 9, second 10 and third 11 zones. These zones include at least one 200 or 250 mm unit.

Each barrel unit has a specific, preregulated temperature. Depending on the prescribed temperature, heating is more or less continuous and gradual. The temperature of each unit can be regulated during the course of the process, depending on the raw materials added and the products required at the outlet of the die.

The first zone 9 is comprised of a unit 12 in which the temperature is equal to the autogenous temperature of the mixture entering the extruder.

According to one variation, the second zone 10 has three units 13 and the third zone 11 has three units 14.

The temperature of the units 13 in the second zone 10 is 90, 100, 140° C. respectively, from one end of the barrel 2 to the other.

The temperature in the units 14 in the third zone 11 is 165, 175, 175° C. respectively, from one end of the barrel 2 to the other.

According to a second variation, the second zone 10 has five units 13 providing gradual heating in five stages from one end of the barrel to the other. The third zone 11 has three units 14 as in the first variation of the application.

According to a third variation, the second zone 10 only has two units 13 and heating is, as a result, less gradual than in the first and second variations. The melting zone 11 has only one unit 14.

In the same way as the barrel being comprised of several units each corresponding to a given temperature, the barrel screws also consist of several elements. Each of these elements has a given structure, from one end to the other. The length of each series of elements may or may not coincide with the length of a unit.

In one application, the diameter D of screw elements is 55.3 mm and the length of each element is 50, 100 or 200 mm. The total length L of screw elements mounted on a screw shaft is 1000 mm, in other words an L/D ratio of 18. This ratio ranges from 14, in the case of four 200-mm units in the barrel, as in the third application, to 33 in the case of nine 200-mm units, as in the second application. This ratio is, for example, 25 in the case of seven 200-mm units According to one application, the barrel 2 of the extruder 1 consists of five 200-mm units, four of which are heated and/or cooled to achieve a precisely regulated temperature, notably by successive heating and heat extraction.

The elements of the single-thread screw are called V1F (pitch in mm). The elements of the double-thread screw are called V2F (pitch in mm). The elements of mixing screws are called MAL (angle in degrees) while the elements of negative-thread screws are called NEG (pitch in mm, number of perforations per thread×dimension in mm).

In a usual application, the profile of the two screws is as follows 200 mm filling zone 200 mm V2F (50 mm);

500 mm mixing and heating zone: 100 mm V1F (50 mm)+50 mm MAL (90°)+150 mm VIF (33 mm)+50 mm MAL (60°)+100 mm V1F (25 mm)+50 mm NEG (−15 mm, 3×6 mm);

300 mm melting zone: 150 mm V1F (33 mm)+150 mm V1F (25 mm).

This is only one example of an application of the invention. There are many more combinations of screw profiles that can be implemented using the same screw elements or other screw elements of a similar design.

In the case of this profile, in the 500 mm mixing and gradual heating zone, the screw has elements of mixing screws and elements of the VIF screw of decreasing thread size (50 then 33 then 15 mm), leading to gradual compression of treated materials.

A description of the die 7 is given below.

The die 7 typically consists of several die elements positioned end to end and connected by means of adapted mechanical attachments. Its size is adapted to provide gradual cooling of the melted and plasticized material, to a temperature of 100° C., if not less, for example to a temperature of 10° C., preferably between 80 and 30° C.

The internal surface of the die 7 has a controlled roughness obtained, for example, by machining the internal metal surface of the die in order to exert shear forces on the product during the cooling process. The internal shape of the die is adapted to the final product required.

The combination of cooling and shear forces on the walls applied during the liquid-to-solid change of state leads to texturization of the material in the form of fibres as described below.

In some cases, the shear forces on the walls and the length of the die can be sufficiently high to allow extrusion of the product without the need for auxiliary cooling outside the die. In the majority of cases, the die 7 includes a cooling system for the outer surface, for example by circulation of cold water in a double sleeve (water between 60° C. and 0° C.). It is also possible to cool the die 7 by means of brine at negative temperature (−1° C. to −20° C.).

The combination of cooling temperature in the die and shear forces on the inner walls of the die 7 is very much dependent on the shape of the die, its length, constituent materials and machining as well as on the characteristics (temperature, moisture, . . . ) and flow rate of the melted material to be cooled down.

According to a first application, the die is a round die made of 316 L stainless steel with a 325 mm² flow section allowing 100 kg/hour of material to be textured over a length of 8 m (8 zones of 1 m each). Cooling is carried out using ice water at 1° C. circulating at a rate of 500 litres/hour. The moisture content of the extruded mixture is about 72%.

According to a second application, the die is a rectangular die made of 316 L stainless steel with a 1200 mm² flow section allowing 350 kg/hour of material to be textured over a length of 6 m (6 zones of 1 m each). Cooling is carried out using ice water at 20° C. circulating at a rate of 1000 litres/hour. The moisture content of the extruded mixture is about 62%.

The linear speed of product discharge from the die 7 is about 2 to about 10 metres/minute.

The die 7 consists of a first uncooled zone 15, which lengthens the far end of the melting zone 11, and at least a second zone 16 cooled by the device above. The temperature of the product discharged from the die is 10 to 100° C. depending on the desired rigidity.

In a first application for example, the uncooled zone 15 has a length of 2 metres.

According to one mode of application, the installation has a first adapter between the far end 6 of the melting zone 11 and the extrusion die 7.

This first adapter generally consists of one (or two) perforation(s) through which the melted and plasticized material is extruded. If there are two perforations, these converge in a single outlet. If the extrusion die has a small diameter, the perforations are generally conical. The first adapter often has two lateral perforations into which probes for measuring melting temperature Tm and pressure P are inserted. The outlet of the first adapter can be round, oval, square, rectangular or with the exact internal shape of the extrusion die (this can be a ludic shape . . . ).

According to one application, in addition to the first adapter, the extruder comprises a second adapter between the first adapter and the extrusion die.

This second adapter can have various internal shapes depending on the internal shape of the first adapter and extrusion die. It can incorporate a diffusion plate consisting of several dozen small perforations which distribute the flow of melted and plasticized material.

In general, the total surface area of perforations in the diffusion plate is set up so as to create a restriction of 10 to 50% with respect to the flow section in the extrusion die.

According to one application, the extrusion pump is inserted between the second adapter and the die in order to allow steady flow into the die for improved stabilisation of flow.

Furthermore, several cooling dies can be arranged in parallel at the outlet of the screw barrel.

The impact of thermo-mechanical treatment in the extruder of products leaving the die will now be described.

Due to the high temperatures used in the melting zone, the thermo-coagulable constituents of the mixture undergo plasticization. The term thermo-coagulable proteins refers to proteins such as whey proteins, egg white, globulins, fish or meat muscle proteins as opposed to non-thermo-coagulable proteins such as caseins or collagen. These thermo-coagulable proteins have the property of gelling or coagulating around 50–90° C. and are therefore in the form of a coagulum or solid gel at 100° C.

The plasticization state is obtained at temperatures in the range of 130 to 200° C., generally around a temperature of 145–170° C. for moisture levels during extrusion in the range of 50 to 80%, generally between 60 and 75%, and fat levels in the dry product during the extrusion process in the range of 0 to 40%, generally between 2 and 20%.

In principle, shear forces lead to reheating by friction. Pressure in the extruder does not affect molecular interactions, particularly between proteins, but does allow high temperatures (130–300° C.) to be obtained without boiling or water vapour formation taking place.

Surprisingly, the transition of thermo-coagulable proteins, especially whey proteins, through this plasticization stage confers on the mixture transferred to the barrel an original viscosity, probably fairly fluid, in the order of 1000 to 500,000 centipoises, which gives it a specific texture during the cooling process in the die.

It is supposed that the mixture passes through a solid state at the beginning of zone 10, through a liquid state in the melting zone 11 (viscosity of 1000 to 100,000 centipoises), a viscous state (viscosity of 100,000 to 500,000 centipoises) in the uncooled zone 15 of the die 7, an uncooled zone in which progressive alignment of the mixture into fluid fibres probably takes place, and finally through a solid state in the cooled zone 16 of the die, a cooled zone in which fibres tending towards the sold state are formed.

During the plasticization process, proteins, particularly whey proteins, undergo a change in structure with a new structure emerging under the combined effect of the cooling and shear forces applied in the die.

The constituents of the mixture, especially whey proteins, rearrange in the form of a macroscopic and microscopic structure, consisting of superimposed layers of aligned or tangled fibres with multiple ramifications, and possibly even fibres arranged in the form of V-shapes. These fibres are interchangeably referred to as ultrafibres or ramified network fibres in the text.

The products 17 obtained by means of the above-described process will now be outlined.

On being discharged from the die 7, the product obtained 17 prior any further treatment being carried out, for example cutting or tearing, is in the form of a roll 18, for example cylindrical with a diameter similar to the diameter of the die in the case of a die with a circular section, produced continuously if a continuous process is used.

This roll 18 contains a set of fibres which can be separated, for example manually, into bundles of fibres, and even individually into ultrafibres.

Fibres typically have a diameter that depends on the raw materials used and the operating conditions within the barrel and extruder die.

Before treatment such as chopping, fibres can be quite long, in the range of several centimetres, for example 4 to 5 centimetres.

Under high magnification, for example ×50, of the product 17 shows that the fibre structure visible in the product at the macroscopic level is also found at the microscopic level. This structure is similar to a fractal, self-repeating structure, in other words fibre ramifications appear to be infinite, in the same way as a hydrographic network. Ramifications continue towards the infinitely small: the same ramified structure is perceived at each level of magnification. This extremely fine fibre structure is also similar to that of striated skeletal muscle of mammals, consisting of a cascade of filament, microfilaments and fibrils. They are called "ultrafibres" because of their extremely fine structure.

At present, the largest fibres are at least 5 to 20 cm long with a diameter of 0.5 to 2 mm, if not in the order of cm for dies with a diameter of 20 to 30 mm.

Associated fibres can be very small, to just within the limits of visual perception, in other words 1 to 2 mm long with a diameter of 0.02 to 0.1 mm.

It is assumed that this fibre network continues down to the molecular level.

Depending on the composition of the initial mixture placed in the extruder and the operating conditions of the extruder, particularly temperature and pressure conditions, a large range of aligned textures is obtained.

This fibre structure leads to rheological and organoleptic properties specific to the product and its derivatives, difficult to characterise instrumentally. A sample of fibres with a diameter of 30 mm and a length of 25 mm has an elasticity that is similar to that of synthetic viscoelastic compounds : relaxation coefficient of 60 to 90%, compared to 100% for rubber. The man skilled in the art is aware that human sensory perception is such that sizes in the order of 10 $\mu$m are detected in the mouth.

FIGS. 3 to 6 show the extruded product with a fibrous structure.

According to one mode of application, the products leaving the die undergo later treatment and are used as base materials or ingredients for a wide range of food preparations, typically incorporated at a rate of 15 to 70% in these preparations.

According to one mode of application, the extruded product undergoes chopping by means of a chopper and/or cutting, crushing, tearing, shredding, etc., so as to obtain chopped fibres forming flakes or bundles. These flakes can be very small in size, to within the limits required for mechanical separation of fibres.

These chopped fibres or ultrafibres are mixed with a variety of other culinary ingredients, such as cheese, milk, cereals, starch, spices and seasoning to form a mixture.

Figures 7, 8:
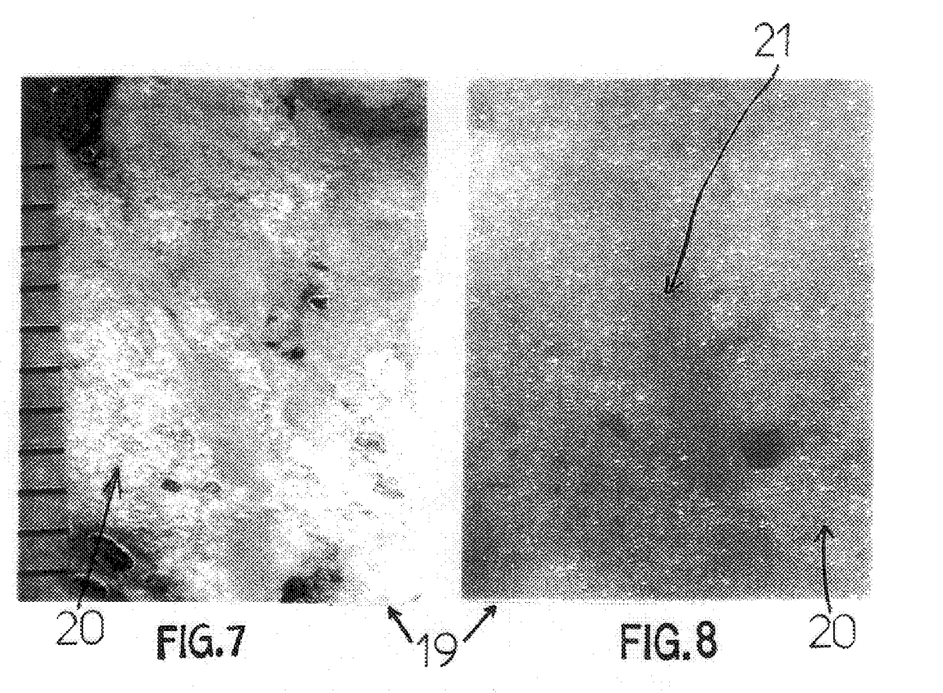
Figure 9:
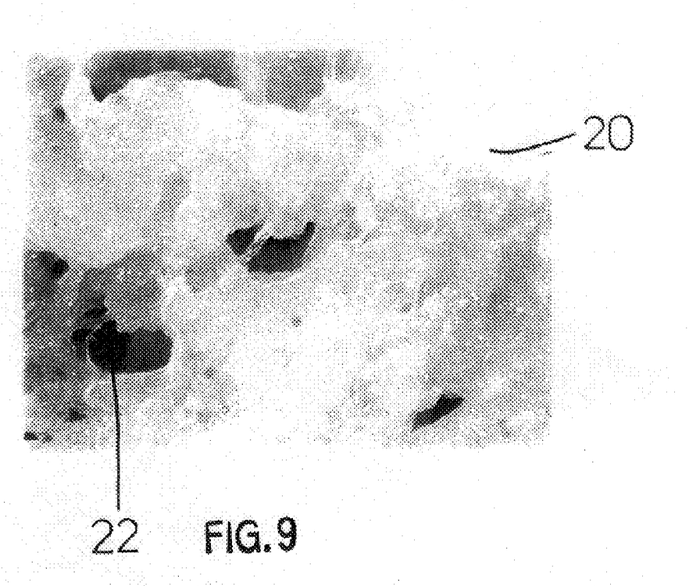
FIG. 9 is a further magnification of a zone showing isolated fibres in diagram 8 (each graduation represents 1 mm).

The composition of this mixture varies depending on the desired fibre-based final product. FIGS. 7 and 8 shows a food preparation 19 containing a matrix 20 incorporating bundles 21. FIG. 9 shows visible fibres 22 in this matrix 20.

Derivative products include, for example, sandwiches, snacks, preparations for ready-made meals, burger- or sausage-shaped cheese products.

In one mode of application, the mixture is shaped, for example by mechanical forming in a shaper, under careful hygiene monitoring.

According to another application, the mixture is shaped in piping which undergoes pasteurisation, slicing and, in some cases, coating or decoration steps.

The resulting products can, for example, be cooked in moulds, removed from the mould or not, then packaged.

These products can also be used as raw materials for other culinary preparations after frying, baking, pasteurisation, sterilisation and other steps.

A few examples are given below of derivative culinary preparations incorporating the product obtained from the extruder, a product based on whey proteins and with a fibrous texture. This product is called "textured whey proteins" in the examples below.

Preparation example no. 1: formulation of a reconstituted steak using textured whey proteins (40%), Emmental (13%), Gouda (7%), Cheddar (5%), whole pasteurised milk (18%), cassava starch (3%), cereal flakes (8%), sodium caseinate (2%), water (3%) and spices (1%).

The preparation is mixed in a blender, shaped, decorated and browned in the oven.

Preparation example no. 2: formulation and production of meat-free sausages using textured whey proteins (77%), Cheddar (10%), large-grained cassava starch (6%), sunflower oil (3%), various other ingredients (3%) and spices (1%).

The preparation is churned under vacuum, introduced into the piping and steam cooked.

Preparation example no. 3: formulation and production of breaded nuggets using textured whey proteins (25%), Emmental (14%), Gouda (14%), breadcrumbs (13%), water (19%), potato starch (11%), milk proteins (3%) and spices (1%).

The mixture is prepared in the cutter, shaped, coated, rolled in flour and breadcrumbs and fried in oil.

Preparation example no. 4: formulation and production of a culinary ingredient rich in milk proteins for addition to salads, starters, savoury stuffing and fillings, soups and gratins using textured whey proteins (85%), pasteurised whole milk based spice marinade (12%), salt (1%), herbs and seasoning (2%).

The preparation is churned under vacuum.

Preparation example no. 5: formulation and production of a sweet pancake using textured whey proteins (55%), dried fruit (12%), wheat-flour (12%), toasted cereal flakes (8%), sugar (7%), milk (5%) and vanilla extract (1%).

The mixture is prepared in the cutter, measured, decorated, cooked on a hotplate and browned.

Preparation example no. 6: formulation and production of a sweet spread using textured whey proteins (25%), yoghurt (55%), fresh fruit (12%), pistachio (4%), sugar (3%) and a gelling agent (1%).

The mixture is prepared in the cutter under vacuum and directly measured into pots.

Preparation example no. 7: formulation and production of a full-fat savoury spread using textured whey proteins (15%), and/or full-fat fromage frais (80%), garlic extract (3%) and chives, salt and other spices (2%).

The preparation is prepared by mixing with an expanding agent with injection of gas, pumping and metering.

According to another application, it is possible to use the extruder to manufacture a stuffed food product. A food stuffing material is introduced through a coextrusion valve 23 opening into the extruder die. The stuffing material is, for example, added at a temperature below about 25° C. so as to cool down the interface with the cheese or dairy preparation extruded on the outside.

The resulting product therefore consists of an outer layer of cheese or milk, whose texture is aligned in the direction of flow inside the die, and a food stuffing of varying composition.

The coextrusion process can obviously be applied to a mixture consisting purely of cheese or dairy raw materials but can also be applied to more complex formulations containing a small proportion of food ingredients of diverse origin wheat, soya, maize, peas, rice, vegetables, etc.

The stuffing can be a cheese or dairy preparation, for example a soft cheese, or it can be a vegetable, meat, fish or seasoning based stuffing.

It is also possible, after the extrusion/coextrusion step, to coat the product with a coating agent such as cereals or other edible solids.

In this way, a product consisting of three layers of inner stuffing, a cheese or dairy based envelope and a coating layer can be obtained.

The shape of the product can also be modified, depending on the cutting tool used 8, for example using a nipping cutter to produce a lengthened cushion shape. In the case of a stuffing product obtained by coextrusion, this application allows the stuffing to be entirely wrapped inside the product by mechanical processing of the product.

The raw materials used in the process will now be described in greater detail.

The composition of the mixture added to the extruder is very similar to the product leaving the die. Water may be lost at the die outlet in some cases as a result of evaporation (about 1 to 5%).

Dry matter in the mixture consists of 30 to 100% of dry matter originating from whey.

When the whey-based material is a powder introduced through the filling zone, the powder is obtained after concentration, ultrafiltration and/or separation on preparatory chromatography columns then spray dried.

The whey-based material introduced into the extruder in liquid form is, for example, a concentrate obtained after ultrafiltration of diafiltration of whey.

In addition to the dry matter resulting from relatively dry or concentrated whey, dry matter in the mixture includes, for example, fats of vegetable or dairy origin (including butter and cream), liquid or dried egg white, concentrated or isolated vegetable proteins, vegetable flour, starches, alimentary hydrocolloids, spices and colouring.

The whey can be a sweet whey from dairy or rennet casein, or sour whey from casein processing.

The amount of casein in the dry matter is low, generally under 10%, which means dairy curds or complexes with a high proportion of casein cannot be used.

Vegetable proteins are, according to one application, wheat proteins, either pure or in the form of a mixture of glutens that can be breaded (glutens at 70–75% of protein, depending on the amount of starch and bran remaining during extraction leading to the production of a protein concentrate).

In one application, a pea, lupin, soya or egg white protein solution or powder is used instead of a wheat gluten powder.

A few examples of the detailed formulation of the mixture are given below.

EXAMPLE 1 powdered whey protein concentrate containing 75% protein 16%;
water: 66%;
sodium caseinate: 1.7%;
wheat protein concentrate containing 72% protein: 13%;
powdered egg white: 1.1%;
complex carbohydrates: 0.5%;
milk fats: 1%;
salt: 0.4%;
flavourings and seasoning: 0.3%.

EXAMPLE 2 powdered whey protein concentrate containing 30% protein: 40%;
water: 30%;
powdered ultrafiltered natural casein 3.7%;
pea protein concentrate containing 68% protein: 6%;
wheat protein concentrate containing 72% protein: 6%;
powdered egg white: 10%;
complex carbohydrates: 1%;
milk fats: 2.5%;
salt: 0.7%;
flavourings and seasoning: 0.1%.

EXAMPLE 3 whey cheese containing 10% protein: 78%;
powdered whey protein concentrate containing 80% protein 18%;
sodium casein: 1%;
complex carbohydrates: 1%;
butter: 2%.

EXAMPLE 4 lactoersum liquid protein concentrate containing 30% protein: 80%;
rennet casein: 3.2%;
pea protein concentrate containing 65% protein: 4%;
wheat protein concentrate containing 72% protein: 4%;
soya protein concentrate containing 67% protein: 4%;
powdered egg white: 1%;
complex carbohydrates: 1%;
milk fats: 2%;
salt: 0.7%;
flavouring and seasoning: 0.1%.

EXAMPLE 5 water: 72%;
powdered whey protein isolate containing 90% protein: 9%;
calcium caseinate: 0.4%;
wheat protein concentrate containing 72% protein: 15%;
complex carbohydrates: 1%;
peanut oil: 2%;
salt: 0.6%

EXAMPLE 6 water: 70%;
powdered whey protein concentrate containing 80% protein: 26.3%;
sodium caseinate: 0.3%;
complex carbohydrates: 0.9%;
butter: 2.5%.

EXAMPLE 7 water: 61%;
powdered whey protein concentrate containing 82% protein: 23%;
wheat protein concentrate containing 12% protein 13%;
powdered egg white: 1%;
spices (1%), vegetable fats (0.5%), salt (0.5%)

What is claimed is:

1. Process for the manufacture of products with an aligned fibrous structure obtained by extrusion baking of a mixture of dairy or cheese origin which includes whey proteins, the fibers forming a network of macroscopic fibers whose diameters are in the order of 0.1 mm to 1 mm, ramified into microscopic fibers with diameters in the order of 1 μm to 0.1 mm, said process comprising:
   a) introduction of raw materials containing whey proteins into an extruder with at least one screw;
   b) transfer of raw materials from one end to another end of an extruder barrel, adjusting the screw(s) and temperature within, from the one end to the other end of the barrel, such that raw materials successively undergo a mixing and heating step up to a temperature of about 130° C., followed by a melting step with an increase in temperature of the material to above 130° C., and an increase in pressure to between 0 and 50 bars, such that plasticization of the material takes place; and c) extrusion at the far end of the barrel of the material obtained after plasticization through a die adapted for texturization, shaping and cooling the material such that an extruded material product with a fibrous structure is obtained.

2. Manufacturing process according to claim 1, wherein cooling of the extruded material takes place in the die to a temperature of 100° C., and comprises an initial cooling phase in an uncooled zone in the die at an outlet of the barrel, followed by a second cooling phase in a cooled zone of the die, wherein the first cooling phase corresponds to an alignment zone of the melted mixture which is in a viscous state with a viscosity of 1000 to 500,000 centipoises, while the second cooling phase corresponds to a change of state from the viscous state to a solid state, the linear flow rate of the product at outlet of the die being in the order of 2 to 10 m/min.

3. Manufacturing process according to claim 1, wherein heating to 130° C. in step b) is gradual or in stages.

4. Manufacturing process according to claim 1, wherein temperatures in the barrel and die are modified to adjust a texture of finished products.

5. Manufacturing process according to claim 1, wherein a mixture placed in the extruder is in the form of a. powder, with all required water added prior to the melting step, or in liquid or paste form.

6. Manufacturing process according to claim 1, wherein whey proteins originate from whey protein concentrates or isolates which are 50 to 90% pure, and also contain lactose, fats, minerals, secondary proteins of casein macropeptide type.

7. Manufacturing process according to claim 1, further comprising a cutting step at the outlet of the die to obtain chopped fibers forming flakes or bundles.

8. Manufacturing process according to claim 1, further comprising a step where the product is dried at the outlet of the die after cutting to produce rehydratable fibers for food preparations.

9. Manufacturing process according to claim 1, further comprising a culinary reconstitution step using chopped fibers mixed with various ingredients.

10. Manufacturing process according to claim 1, further comprising a shaping step comprised of mechanical forming processes using a shaper or moulds or piping followed by pasteurisation and slicing, with the products obtained undergoing at least one of the following steps: decoration, coating, stamping, filling, frying, baking, pasteurisation, sterilisation, packaging.

11. Manufacturing process according to claim 1, wherein material transferred to the die is filled with a filling product during the extrusion step, added through a coextrusion valve opening into the die.

12. Manufacturing process according to claim 11, wherein filling product is obtained by means of an extrusion process.

13. The process of claim 1, wherein said melting step occurs between about 140° C. and 200° C.

14. The process of claim 1, wherein said plasticization is of whey proteins.

15. The process of claim 2, wherein said cooling takes place to a temperature between about 80° C. and 100° C.

16. The process of claim 6, wherein said purity is 70 to 80% pure.

17. The process of claim 9, wherein said various ingredients comprises at least one of cheese, milk and derivative products, cereals, starches, flour or semolina, fats, spices, season and flavoring.

18. Manufacturing process according to claim 7, wherein said cutting step comprises at least one of chopping, slicing, crushing, tearing, or shredding.

* * * * *